Patented June 14, 1949

2,473,460

UNITED STATES PATENT OFFICE 2,473,460

CONDENSATION PRODUCTS OF CITRIC ACID WITH LONG CHAIN ALIPHATIC MONOHYDRIC ALCOHOLS

James H. Werntz, Wilmington, Del., assignor to E. I. du Pont de Nemours & Company, Wilmington, Del., a corporation of Delaware No Drawing. Application August 6, 1946, Serial No. 688,687

12 Claims. (Cl. 260—78.3)

This invention relates to new surface-tension modifying compounds and to a process for their manufacture. More specifically this invention relates to new condensation products and to liquid compositions containing these products which are valuable especially as assistants for the textile and similar industries.

It is an object of this invention to provide new condensation products which possess useful and valuable properties. A further object of this invention is to provide new surface-tension modifying compounds which in view of their colloidal properties are suitable for use in the textile, leather, lacquer, paper, rubber and like industries. A still further object is to provide a new and practical method for the manufacture of these novel condensation products. Another object is to provide liquid compositions containing new surface-tension modifying agents. An additional object is to provide new synthetic detergents. Still another object is to provide a novel and economical synthesis of surface-tension modifying agents from low cost, readily available raw materials.

These objects are accomplished by new surface-tension modifying compounds obtained by reacting an open-chain aliphatic monohydric alcohol containing at least eight carbon atoms with at least three molar equivalents of citric acid under resin-forming conditions.

The new condensation products of this invention are prepared by heating an open-chain aliphatic monohydric alcohol containing at least eight carbon atoms with citric acid at about 150° to 225° C. and preferably at 190° to 200° C. The condensation of these two reactants is preferably carried out in an inert atmosphere either at atmospheric or subatmospheric pressure. During the reaction, water is evolved with subsequent increase in the viscosity of the melt. In order to assist in the removal of the water, it is convenient to carry out the reaction while blowing nitrogen or other inert gas through the reaction mixture. Best results are obtained by mechanically blending or mixing the citric acid with the monohydric alcohol before heating. Either pure citric acid or a technical grade of citric acid may be employed.

The preferred proportion of reactants depends on the nature of the monohydric alcohol or mixture of monohydric alcohols employed in the reaction. Detergents with satisfactory solubility in water have been obtained by using three moles of citric acid with one mole of octanol-1 and six moles of citric acid with one mole of dodecanol-1. Larger proportions of citric acid may be employed to vary the properties of the products.

The products range from lemon colored, transparent, viscous resins to wax-like solids. The preferred products are readily dispersible in water to give sudsing dispersions of good clarity which are stable on storage. The products can be prepared so that they are soluble in water on in part insoluble in water and in part form with water more or less stable emulsions. Products can also be obtained which have low solubility in water. These solubility characteristics are influenced by the kind and length of the organic radical in the aliphatic monohydric alcohol. As the carbon content of straight chain aliphatic alcohols is increased, with the molar ratio of citric acid to alcohol maintained constant, the solubility in water of the resulting resin is decreased. However, if the ratio of citric acid is increased, water-soluble or water-dispersible products can be obtained with monohydric alcohols having up to 30 carbon atoms, by the use of increased amounts of citric acid ranging up to 30 molar equivalents. Branched chain alcohols form products having better solubility and sudsing characteristics than straight chain alcohols having the same number of carbon atoms. Since the products made from alcohols having from 8 to 18 carbon atoms have the best solubility in water and also possess the best sudsing properties, these are generally speaking the preferred products. With these preferred alcohols the ratio of citric acid is usually from 3 to 20 moles per mole of alcohol. The solutions and emulsions respectively are stable to alkalis. Acids and agents causing hardness in water do not suppress the sudsing properties of water solutions of these products. The preferred products are also soluble or dispersible in organic solvents, such as ethyl alcohol, benzene and acetic acid.

This invention is further illustrated by the following examples in which the parts are given by weight, unless otherwise specified.

Example I

There were mixed together in a glass vessel equipped with a stirring device and connected with an air-cooled receiver 9.3 parts of dodecanol-1 and 57.6 parts pulverized citric acid (USP grade). This is a molar ratio of 1:6. The reaction vessel was heated by means of a molten metal bath. The temperatures were recorded for the bath. At 154° C., the reaction mixture was a cloudy melt. Water vapor was given off after heating a few minutes. The temperature was raised during the next 30 minutes to 189° C. During this period the reaction mixture gradually thickened as evidenced by a pronounced tendency to foam. The reaction mixture was now a clear brown liquid and was heated 30 minutes at 190–205° C. Five parts of water were recovered. The carbon dioxide which was given off, gave a white precipitate when bubbled through lime water. It required a substantial amount of alkali to neutralize the carbon dioxide. The product was a clear brown molasses-like liquid which just flows at room temperature, and was water soluble.

The dodecanol-1 modified polycitric acid dissolved to yield 10% solutions in ethyl alcohol and in acetic acid at room temperature. It was incompletely soluble in benzene at refluxing temperatures. The resulting clear, supernatant benzene solution was decanted from the benzene-insoluble portion and the benzene was then evaporated from the solution by heating on the steam bath. A clear yellow viscous polymer was recovered which was soluble in water and gave sudsing solutions.

A 0.2% water solution of dodecanol-1 modified polycitric acid was clear after storage for one month. This solution was acid to litmus. It required a substantial amount of 1% sodium hydroxide solution to neutralize it. A portion of this solution acidified with dilute hydrochloric acid, showed no precipitation after 24 hours and while a slight precipitate was noted after storage for 30 days, the solution foamed strongly when shaken. A portion of the solution treated with calcium chloride solution showed a slight precipitate after storage for 24 hours, but even after storage for 30 days, the solution still foamed when shaken. A portion of the solution neutralized with sodium hydroxide gave more suds than the original acidic solution or the solutions containing calcium chloride or hydrochloric acid. The solution neutralized with sodium hydroxide was transparent after storage for 30 days.

A small strip of standard soiled cotton fabric was shaken with 5 parts of the 0.2% solution of dodecanol-1 modified polycitric acid in water, intermittently for several hours. The test fabric after air-drying was colored light gray in contrast with the dark gray color of the control. This cleansing power compared favorably with a synthetic detergent solution containing a sodium hydrocarbon sulfonate tested in the same manner.

Example II

A homogeneous product was obtained by processing as in Example I, a mixture of 13 parts octanol-1 and 96 parts citric acid. This product had good solubility in water and possessed good foaming characteristics. This is a molar ratio of 1:5.

Example III

A mixture of 3 parts dodecanol-1 with 27 parts citric acid was processed as in Example I resulting in a homogeneous product having good solubility and foaming characteristics in water. This is a molar ratio of 1:9.

Example IV

The product obtained with a mixture of 6 parts dodecanol-1 and 18 parts citric acid processed as in Example I was clear when hot, but on cooling a small amount of brown resin precipitated. This product was soluble in water and had good foaming characteristics. This is a molar ratio of 1:3.

It is necessary in this invention to condense citric acid solely with an open-chain aliphatic monohydric alcohol or solely with a mixture of such alcohols to obtain products having the novel characteristics described herein. For example, citric acid treated alone by the procedure of Example I yielded a soft, brown resin which did not flow at room temperature. There was very little foaming of the reaction mixture during its processing, although water and carbon dioxide were given off.

A mixture of 12 parts coconut oil monoglyceride and 57.6 parts citric acid was similarly processed. As in the case of citric acid, there was very little foaming during the reaction. Water and carbon dioxide were evolved. The product separated into an upper grease-like layer and a lower brittle resinous layer, resembling polycitric acid.

With a dodecanol-1/citric acid/glycerol, 6/36/16.5 mixture, the product gelled after heating 45 minutes at about 195° C. The gelled, non-homogeneous product was sparingly soluble in water and was acid to litmus.

Solutions of the above products were compared with the new products of this invention by dissolving 2 grams of each in one liter of distilled water. The solutions of polycitric acid and of the dodecanol-1 modified polycitric acid of Example I were transparent. The solution of the monoglyceride product was cloudy and on standing, precipitated a solid. The solution of dodecanol-1/citric acid/glycerol resin was too insoluble in water to test.

The solution of the polycitric acid did not foam when shaken. Polycitric acid is not a sudsing agent. The dodecanol-1 modified polycitric acid gave a greater amount of suds than the monoglyceride modified product. These results indicate the unsuitability of polyhydric alcohols such as glycerol or the monoglycerides as modifiers of citric acid for use as surface tension modifying compounds.

In addition to the long-chain monohydric alcohols described in the preceding examples, there can be employed saturated or unsaturated aliphatic alcohols, such as decanol-1, tetradecanol-1, hexadecanol-1, octadecanol-1, 2-ethyl hexanol-1, pentadecanol-8, oleyl alcohol, and such secondary alcohols as are obtained by the addition of water to long-chain olefins such as dodecene-2. There can also be employed the mixture of monohydric alcohols obtained by the carboxylic reduction of coconut oil, sperm oil, beef tallow, peanut oil and cottonseed oil.

Temperatures ranging from 150° up to 225° C. can be employed for the condensation. In most cases it is preferred to heat the reaction mixture to that tempertaure within this range at which the reaction mixture is in a molten condition and at which point there is a continual evolution of water. Excellent results are obtained by using a vapor bath of octanol-1 as a source of heat.

The time required for carrying out the condensation ranges from a fraction of an hour to several hours, depending on the temperature, efficiency of agitation, ratio of reactants and the compatibility of the reactants. In general, the condensation of the preferred reactants to homogeneous water-soluble products is completed in about one-half to three hours. It is desirable to stop heating the reaction mixture when the evolution of water becomes negligible.

The new compositions of this invention belong to the general class of capillary-active materials in that they have colloidal properties, and therefore can be advantageously used in any process involving wetting, penetrating deterging, dispersing, emulsifying, frothing, foaming, and kindred phenomena. They can be used alone or in combination with suitable detergents for cleansing and scouring vegetable, animal, and synthetic fibers when removing fatty or oily materials or, in general, in place of soap for cleansing operations. If desired, they can be used in admixing with adjuvants, for example, water-soluble salts of phosphoric acid such as alkali pyrophosphates or alkali metaphosphates, other inorganic salts, for example those altering the pH value of the mixture such as sodium carbonate or sodium silicate, or pure diluents such as sodium sulfate or sodium chloride, bleaching agents, or the like.

As many apparently widely different embodiments of this invention may be made without departing from the spirit and scope thereof, it is to be understood that I do not limit myself to the specific embodiments thereof except as defined in the appended claims.

I claim:

1. A method of preparing a surface-tension modifying agent which comprises condensing at a temperature of 150° to 225° C. from three to thirty molar equivalents of citric acid solely with one molar equivalent of an open-chain aliphatic monohydric alcohol containing from eight to thirty carbon atoms.

2. A method of preparing a surface-tension modifying agent which comprises condensing at a temperature of 150° to 225° C. from three to thirty molar equivalents of citric acid solely with one molar equivalent of a mixture of open-chain aliphatic monohydric alcohols, each of which contains from eight to thirty carbon atoms.

3. A method of preparing a surface-tension modifying agent which comprises condensing at a temperature of 190° to 200° C. from three to thirty molar equivalents of citric acid solely with one molar equivalent of an open-chain aliphatic monohydric alcohol containing from eight to eighteen carbon atoms.

4. A method of preparing a surface-tension modifying agent which comprises condensing at a temperature of 150° to 225° C. from three to twenty molar equivalents of citric acid solely with one molar equivalent of octanol-1.

5. A method of preparing a surface-tension modifying agent which comprises condensing at a temperature of about 150° to 225° C. from three to twenty molar equivalents of citric acid solely with one molar equivalent of dodecanol-1.

6. A resinous surface-tension modifying agent obtained as the condensation product of from three to thirty molar equivalents of citric acid solely with one molar equivalent of an open-chain aliphatic monohydric alcohol containing from eight to thirty carbon atoms.

7. A resinous surface-tension modifying agent obtained as the condensation product of from three to thirty molar equivalents of citric acid solely with one molar equivalent of a mixture of open-chain aliphatic monohydric alcohols, each of which contains from eight to thirty carbon atoms.

8. A resinous surface-tension modifying agent obtained as the condensation product of from three to twenty molar equivalents of citric acid solely with one molar equivalent of octanol-1.

9. A resinous surface-tension modifying agent obtained as the condensation product of from three to twenty molar equivalents of citric acid solely with one molar equivalent of dodecanol-1.

10. A resinous surface-tension modifying agent obtained as the condensation product of five molar equivalents of citric acid solely with one molar equivalent of octanol-1.

11. A resinous surface-tension modifying agent obtained as the condensation product of three molar equivalents of citric acid solely with one molar equivalent of dodecanol-1.

12. A resinous surface-tension modifying agent obtained as the condensation product of nine molar equivalents of citric acid solely with one molar equivalent of dodecanol-1.

JAMES H. WERNTZ.

REFERENCES CITED

The following references are of record in the file of this patent:

UNITED STATES PATENTS

| Number | Name | Date |
|---|---|---|
| 2,122,716 | Graves | July 5, 1938 |